US009218531B2

(12) United States Patent
Fukui et al.

(10) Patent No.: US 9,218,531 B2
(45) Date of Patent: Dec. 22, 2015

(54) IMAGE IDENTIFICATION APPARATUS, IMAGE IDENTIFICATION METHOD, AND NON-TRANSITORY COMPUTER READABLE MEDIUM

(71) Applicant: FUJI XEROX CO., LTD., Minato-ku, Tokyo (JP)

(72) Inventors: Motofumi Fukui, Kanagawa (JP); Ryota Ozaki, Kanagawa (JP); Noriji Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 173 days.

(21) Appl. No.: 13/942,299

(22) Filed: Jul. 15, 2013

(65) Prior Publication Data
US 2014/0198980 A1     Jul. 17, 2014

(30) Foreign Application Priority Data

Jan. 11, 2013  (JP) ................................ 2013-003575

(51) Int. Cl.
G06K 9/62      (2006.01)
G06K 9/00      (2006.01)
(52) U.S. Cl.
CPC ................................. G06K 9/00677 (2013.01)
(58) Field of Classification Search
None
See application file for complete search history.

(56) References Cited

U.S. PATENT DOCUMENTS

| | | | |
|---|---|---|---|
| 7,181,056 B2 * | 2/2007 | Campanini et al. | 382/132 |
| 7,280,697 B2 * | 10/2007 | Perona et al. | 382/225 |
| 8,649,555 B1 * | 2/2014 | Bregler et al. | 382/103 |
| 2008/0279423 A1 * | 11/2008 | Zhang et al. | 382/118 |
| 2009/0304290 A1 | 12/2009 | Fukaya et al. | |
| 2010/0014756 A1 * | 1/2010 | Kato et al. | 382/173 |
| 2010/0076921 A1 * | 3/2010 | Kato et al. | 706/52 |
| 2011/0216965 A1 * | 9/2011 | Rother et al. | 382/159 |
| 2012/0039527 A1 * | 2/2012 | Qi et al. | 382/159 |
| 2012/0093396 A1 * | 4/2012 | Dai et al. | 382/159 |
| 2012/0148118 A1 * | 6/2012 | Lee et al. | 382/118 |
| 2013/0108131 A1 * | 5/2013 | Abramoff et al. | 382/131 |
| 2013/0121565 A1 * | 5/2013 | Wang et al. | 382/159 |

FOREIGN PATENT DOCUMENTS

| | | | |
|---|---|---|---|
| JP | 2005-149506 A | 6/2005 | |
| JP | 2008-159056 A | 7/2008 | |
| JP | 2009-295100 A | 12/2009 | |
| JP | 2010-97610 A | 4/2010 | |

* cited by examiner

Primary Examiner — Vikkram Bali
(74) Attorney, Agent, or Firm — Sughrue Mion, PLLC

(57) ABSTRACT

An image identification apparatus includes following components. A first generative model creation unit extracts feature information from identification-target images which belong to an identification-target category, and creates a first generative model on the basis of the feature information. A classification unit applies the first generative model to each not-identification-target image which belongs to a not-identification-target category so as to determine a probability of the not-identification-target image belonging to the identification-target category, and classifies the not-identification-target image to a corresponding one of not-identification-target groups in accordance with the probability. A second generative model creation unit that extracts feature information from not-identification-target images which belong to a corresponding one of the not-identification-target groups, and creates a second generative model of each not-identification-target group on the basis of the corresponding feature information.

8 Claims, 11 Drawing Sheets

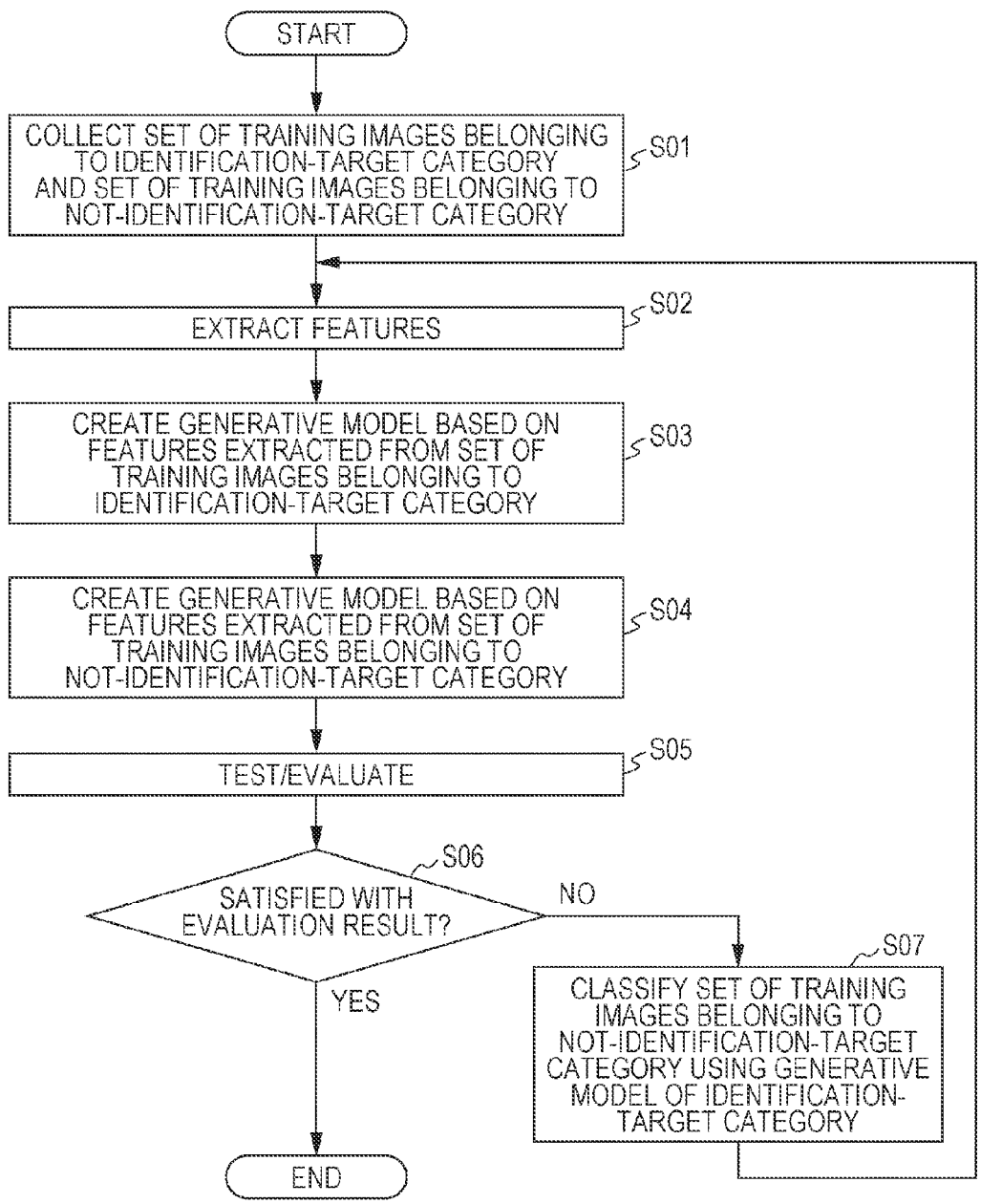

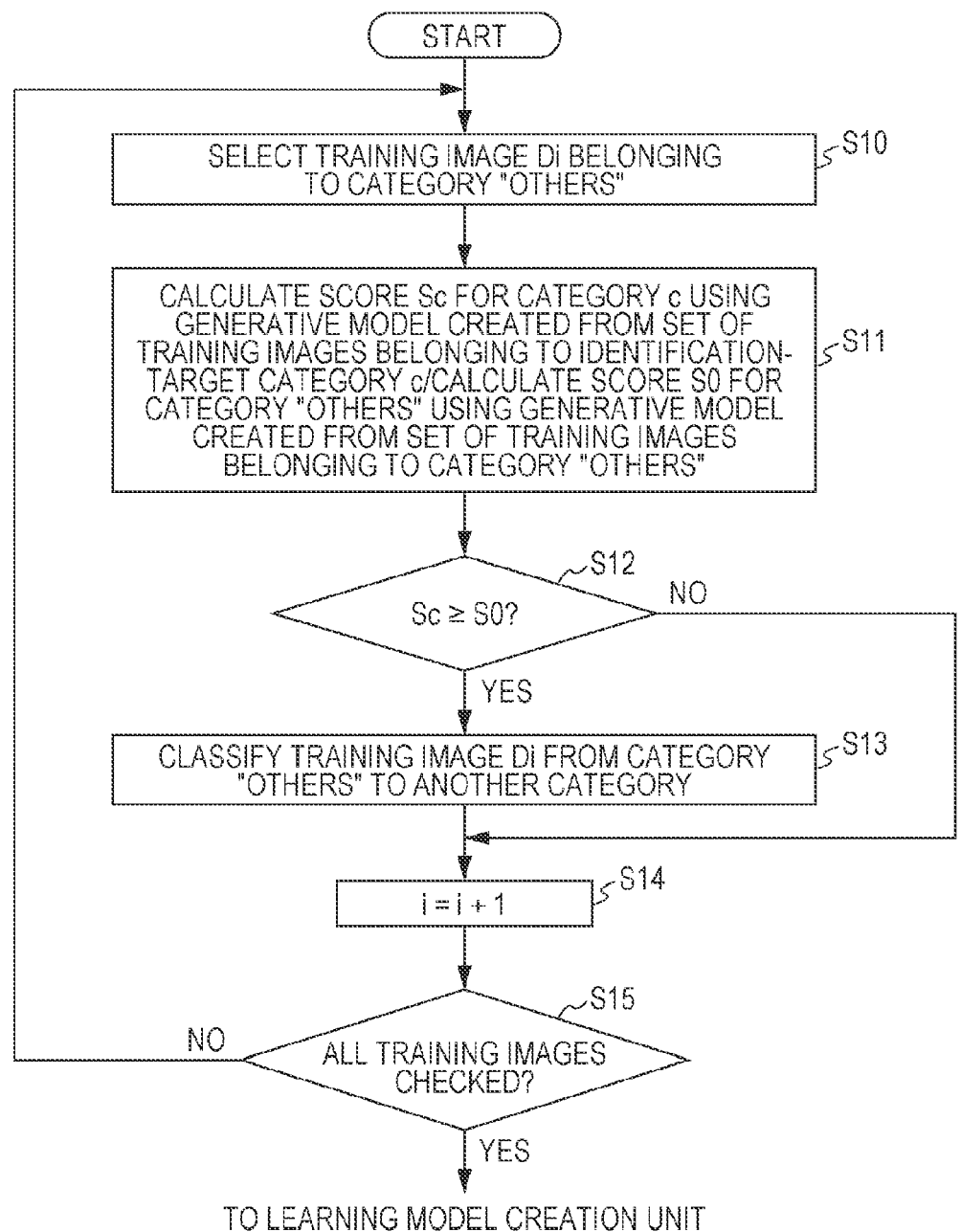

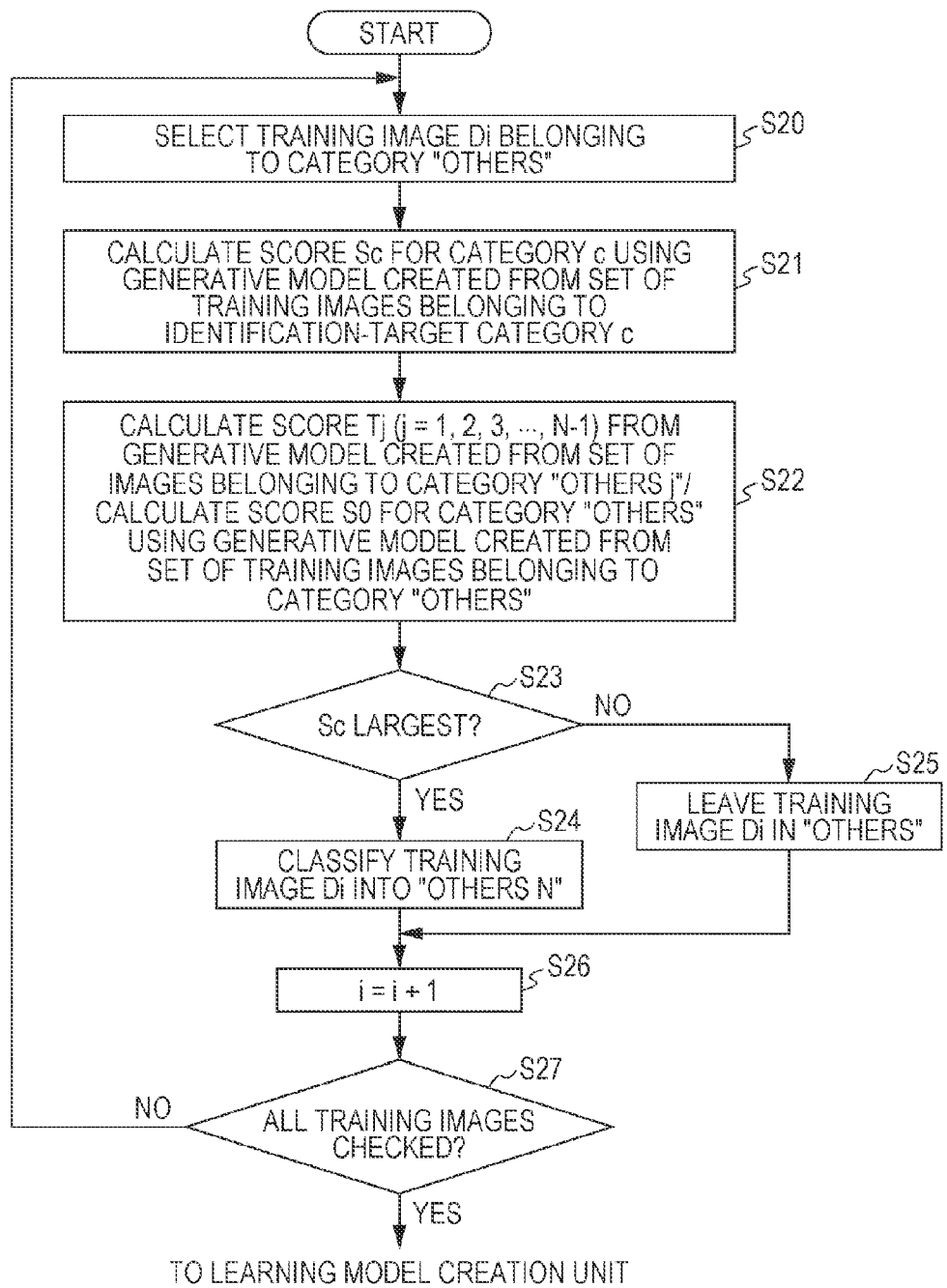

IMAGE IDENTIFICATION APPARATUS, IMAGE IDENTIFICATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-003575 filed Jan. 11, 2013.

BACKGROUND (i) Technical Field

The present invention relates to an image identification apparatus, an image identification method, and a non-transitory computer readable medium for identifying image data.

(ii) Related Art

Some image annotation systems with a learning function are constructed using classifiers, such as support vector machines. Classifiers, when used as learning models, require many images that serve as positive examples and as negative examples. Erroneous annotation resulting from automatic collection of training images or the like possibly decreases the identification ability of classifiers significantly. On the other hand, generative models, which learn a distribution of image features, do not require a huge number of training images and allow a certain amount of noise (that is, erroneous annotation) but the identification ability thereof is often lower than that of classifiers.

SUMMARY

According to an aspect of the invention, there is provided an image identification apparatus including a first generative model creation unit, a classification unit, and a second generative model creation unit. The first generative model creation unit extracts feature information from a set of identification-target images which belong to an identification-target category, and creates a first generative model on the basis of the feature information. The first generative model is used to determine a probability of an image belonging to the identification-target category. The classification unit applies the first generative model to each of a set of not-identification-target images which belong to a not-identification-target category which is different from the identification-target category so as to determine a probability of the not-identification-target image belonging to the identification-target category, and classifies the not-identification-target image to a corresponding one of plural not-identification-target groups in accordance with the probability. The second generative model creation unit extracts feature information from each set of not-identification-target images which belong to a corresponding one of the plural not-identification-target groups, and creates a second generative model of each of the plural not-identification-target groups on the basis of the corresponding feature information. Each second generative model is used to determine a probability of an image belonging to a corresponding one of the plural not-identification-target groups.

BRIEF DESCRIPTION OF THE DRAWINGS

An exemplary embodiment of the present invention will be described in detail based on the following figures, wherein:

FIG. 4 is a flowchart illustrating an example of an operation performed by the image identification apparatus according to the exemplary embodiment;

FIG. 5 is a flowchart illustrating an example of an operation according to a first example;

FIG. 7 is a flowchart illustrating an example of an operation according to a second example;

DETAILED DESCRIPTION

Figure 1:
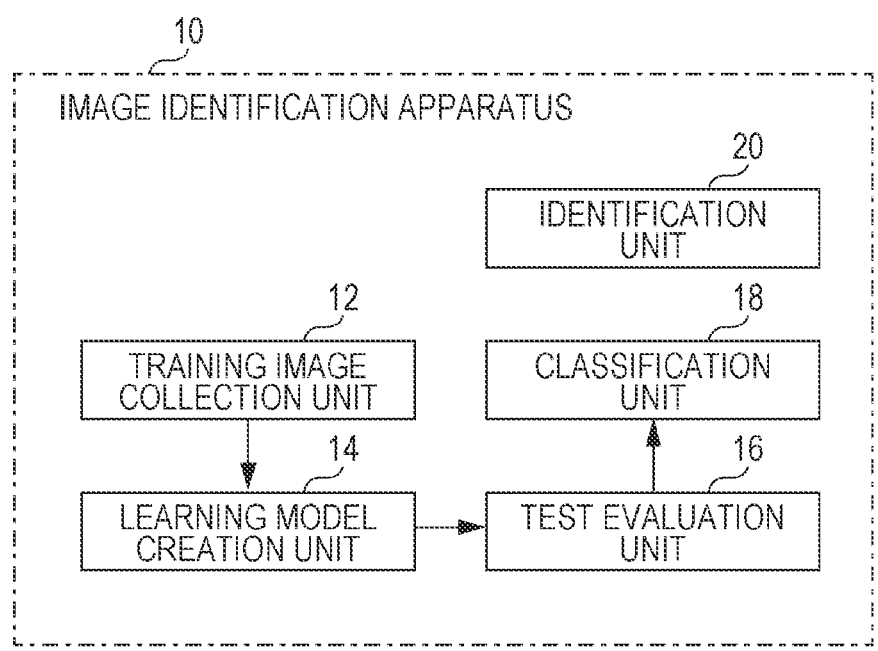
FIG. 1 is a block diagram illustrating an example of an image identification apparatus according to an exemplary embodiment of the present invention.

FIG. 1 illustrates an example of an image identification apparatus according to an exemplary embodiment of the present invention. An image identification apparatus 10 includes a training image collection unit 12, a learning model creation unit 14, a test evaluation unit 16, a classification unit 18, and an identification unit 20. The image identification apparatus 10 creates a generative model from a set of training images which belong to a specific identification-target category. The image identification apparatus 10 then applies the generative model to each of a set of training images which belong to a not-identification-target category to classify the training image belonging to the not-identification-target category into a corresponding one of plural groups. Thereafter, the image identification apparatus 10 creates a generative model from each set of training images which belong to a corresponding one of the plural groups.

The training image collection unit 12 collects a set of training images which belong to a specific category to be identified (hereinafter, referred to as an "identification-target category") and a set of training images which belong to a category (hereinafter, referred to as a "not-identification-target category") other than the identification-target category. For convenience of explanation, a set of training images which belong to an identification-target category may be referred to as a "set of identification-target images", whereas a set of training images which belong to a not-identification-target category may be referred to as a "set of not-identification-target images". A set of identification-target images include plural training image data items belonging to a specific identification-target category. A set of not-identification-target images include plural training image data items which are negative examples of the set of identification-target images. The training image collection unit 12 may collect sets of identification-target images, each of the sets belonging to a corresponding one of plural identification-target categories, and a set of not-identification-target images that are negative examples for the plural identification-target categories in common. Training image data items equivalent to negative examples do not belong to identification-target categories but belong to a category "others" (that is, a not-identification-target category) other than the identification-target categories. Also, a set of identification-target images may also be referred to as a set of positive example training images, and an identification-target category may also be referred to as a positive example category. In contrast, a set of not-identification-target images may also be referred to as a set of negative example training images, and a not-identification-target category may also be referred to as a negative example category.

For example, when an image annotation system which grants an image, such as a still image or a moving image, tag information related to the image is constructed, the training image collection unit 12 collects sets of training image data items, each of the sets belonging to a corresponding one of categories (identification-target categories) to be identified by the image annotation system. For example, the training image collection unit 12 collects hundreds to thousands of training image data items for each category. The training image data items may be automatically collected using an image retrieval system or semi-automatically collected using images contained in encyclopedias or the like. The training image collection unit 12 also collects training image data items (training image data items belonging to a category "others") which are negative examples for the identification-target categories in common. In order to suppress biased image selection, the training image collection unit 12 may collect a larger number of not-identification-target training image data items than the number of identification-target training image data items. Note that image data items belonging to the category "others" may contain various training image data items. For example, a training image data item belonging to an identification-target category may belong to the category "others". Conversely, a training image data item, which does not belong to an identification-target category, may be mistakenly contained in the identification-target category. In this way, a set of training images may include noise.

Figure 2:
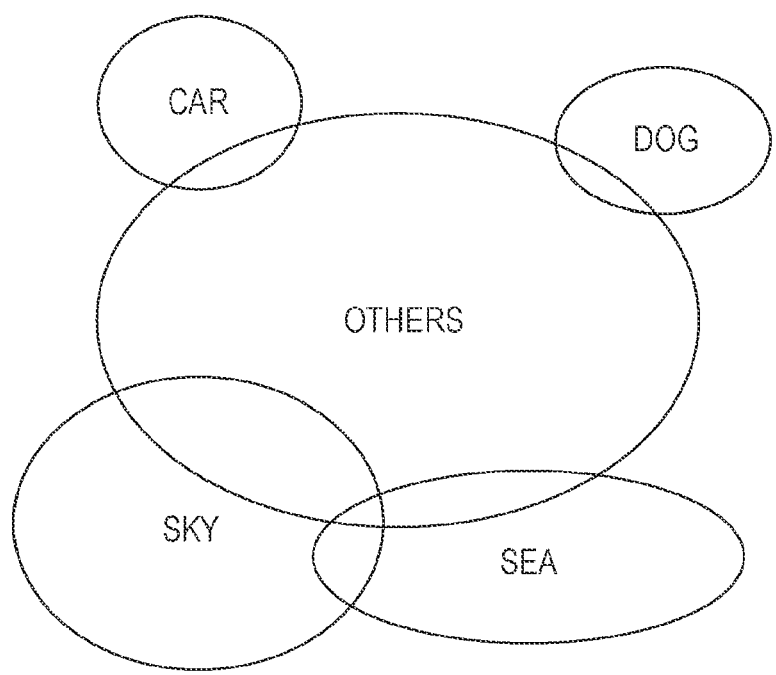
FIG. 2 is a schematic diagram illustrating an example of categories.

FIG. 2 illustrates an example of categories. By way of example, a description will be given of the case in which four categories are subjected to identification. Each collected training image data item belongs to a corresponding one of the four identification-target categories and the not-identification-target category (the category "others"), which includes negative examples for the four identification-target categories in common. The example illustrated in FIG. 2 shows categories "car", "dog", "sea", and "sky" as identification-target categories. The category "others" is a not-identification-target category including negative examples for the categories "car", "dog", "sea", and "sky" in common. The size of each region is proportional to the number of training image data items belonging to a corresponding category. The number of training image data items belonging to the category "others" is larger than that of training image data items belonging a corresponding one of the identification-target categories. Also, each identification-target category may share a region with the category "others". For example, an image including a car may belong to the category "others", or an image not including a dog may belong to the category "dog". For convenience of explanation, the category "others" created during collection of training image data items may be hereinafter referred to as a category "original others".

The learning model creation unit 14 creates a learning model of each category from a corresponding set of training images which belong to the category. In the present exemplary embodiment, a learning model is a generative model. The learning model creation unit 14 creates a generative model for each category. Specifically, the learning model creation unit 14 creates a generative model from each set of identification-target images belonging to a corresponding one of the identification-target categories and a generative model from the set of not-identification-target images belonging to the not-identification-target category (the category "others"). Referring to the example illustrated in FIG. 2, the learning model creation unit 14 creates generative models for the categories "car", "dog", "sea", "sky", and "others." A generative model of a certain category is used to calculate a probability of a given image data item belonging to the category or a score that is proportional to the probability. For example, the Gaussian mixture model, Naive Bayes Model, or the like is a generative model. Note that the learning model creation unit 14 is equivalent to an example of first, second, and third generative model creation units. For convenience of explanation, a generative model created from a set of identification-target images which belong to an identification-target category may be hereinafter referred to as an "identification-target generative model", whereas a generative model created from a set of not-identification-target images which belong to a not-identification-target category (the category "others") may be hereinafter referred to as a "not-identification-target generative model".

Now, creation of a generative model will be described. The learning model creation unit 14 creates a generative model for each category c. First, the learning model creation unit 14 extracts feature vectors F from each training image data item D. The feature vectors F are constituted by general features of an image, such as colors and gradients, and are local features or the like obtained by performing sampling on the entire image at certain intervals. When n features are extracted from each training image data item, the feature vectors are denoted by $F=\{f_1, f_2, \ldots, f_n\}$, where $f_k$ denotes the k-th feature vector extracted at a certain position of the image. The learning model learns a distribution of features of a corresponding category c. For example, when the Gaussian mixture model performs learning, a distribution $P(f|c)$ is denoted by a weighted sum of plural Gaussian distributions. In the present exemplary embodiment, a generative model is created for the category "others".

Figure 3:
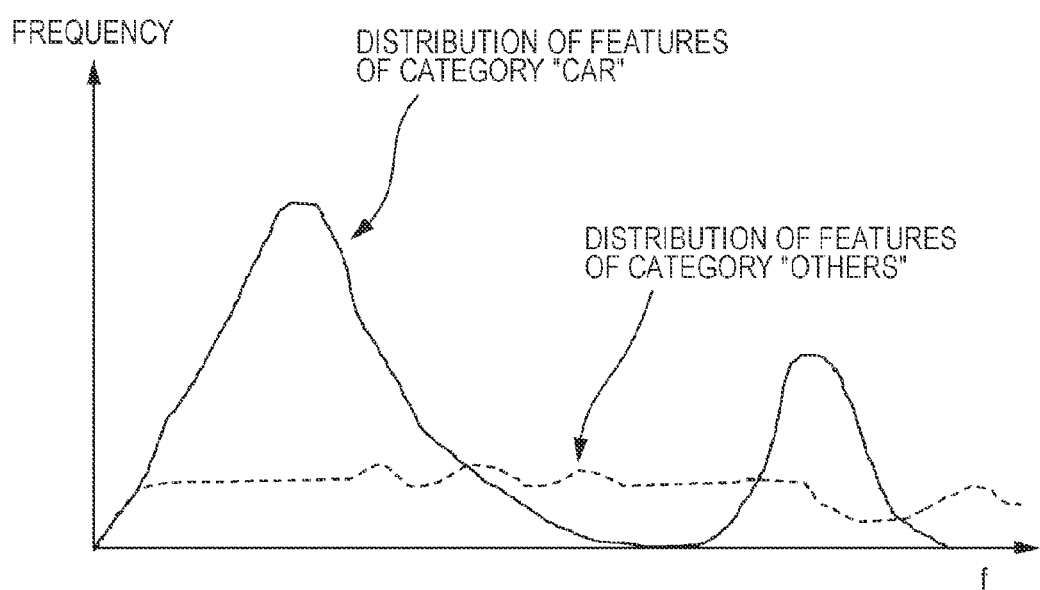
FIG. 3 is a graph illustrating distributions of features.

FIG. 3 illustrates an example of distributions of features. For example, a distribution of features of training image data items belonging to the category "car" has its peak at a specific position, whereas a distribution of features of training image data items belonging to the category "others" is substantially flat all over the feature space. Because the distribution of features of the category "others" is substantially flat (which indicates that a low posterior probability is given for any feature) in this way, a generative model obtained from such a distribution of features gives a small score for any feature. As a result, the image identification ability of such a generative model tends to be low.

The test evaluation unit 16 uses evaluation image data items, which are different from training image data items and are prepared in advance, to evaluate each generative model created by the learning model creation unit 14. The evaluation image data items are each classified into a corresponding one of categories (the identification-target and not-identification-target categories) just like the training image data items. On the basis of the identification result of the evaluation image data items, a recall ratio, accuracy, or the like is calculated. The test evaluation unit 16 extracts feature vectors, which are of the same kind as the feature vectors extracted from the training image data items, from evaluation image data items J.

The test evaluation unit 16 uses, for example, Equation below to calculate a conditional probability of a category c for given feature vectors. Equation below assumes independency of conditional probabilities of individual feature vectors.

$$P(c \mid F) = P(c \mid f_1, f_2, \ldots, f_n) = \frac{P(f_1, f_2, \ldots, f_n \mid c) * P(c)}{P(f_1, f_2, \ldots, f_n)} = \frac{P(c)}{P(f_1, f_2, \ldots, f_n)} * \prod_i P(f_i \mid c) \quad \text{[Math. 1]}$$

Here, $P(f_i \mid c)$ on the right hand side is calculated by using a generative model, such as the Gaussian mixture model or Naive Bayes Model. Also, P(c) is a prior probability of the category c and thus is calculated, whereas $P(f_1, f_2, \ldots, f_n)$ is independent of the category c. Logarithms of both sides of Equation are determined and the resulting logarithms are used as the score. When feature vectors F of a certain image is given, a category to which the image is to be classified is identified in accordance with the magnitude of the score. For example, a category with the largest score among the scores for the individual categories may be identified as a category of the image. Alternatively, all categories with scores that are larger than or equal to a threshold may be identified as categories of the image. In this case, one image may be assigned multiple categories or may be assigned no category. In evaluation of a generative model using evaluation image data items, for example, an average recall ratio or an average accuracy of the evaluation image data items, an F-value of a harmonic mean thereof, or the like may be used to evaluate the generative model. The test evaluation unit 16 outputs the evaluation result. The user possibly improves the generative model until the user is satisfied with the evaluation result.

The classification unit 18 applies each generative model created from a corresponding set of identification-target images which belong to a corresponding identification-target category (that is, an identification-target generative model) to each of a set of not-identification-target images which belong to the category "others", and classifies the not-identification-target image to a corresponding one of the multiple not-identification-target groups. For example, the classification unit 18 applies an identification-target generative model and a not-identification-target generative model to each of a set of not-identification-target images which belong to the category "others". The classification unit 18 then classifies a not-identification-target image whose score obtained by applying the identification-target generative model is larger than or equal to its score obtained by applying the not-identification-target generative model, into one not-identification-target group. In this way, a not-identification-target category (the category "others") is divided into two not-identification-target groups. Alternatively, the classification unit 18 may repeatedly apply the identification-target generative model and the not-identification-target generative model, and may classify each of the set of not-identification-target images into a corresponding one of the multiple not-identification-target groups. Alternatively, the classification unit 18 may apply generative models of identification-target categories to each not-identification-target image, and may classify the not-identification-target image into a sub-category of the not-identification-target category in accordance with a generative model that gives the largest score.

After the set of not-identification-target images are classified into the multiple not-identification-target groups by the classification unit 18, the learning model creation unit 14 creates a generative model of each of the multiple not-identification-target groups from a corresponding set of not-identification-target images which belong to the not-identification-target group. In this way, each generative model for identifying images that belong to a corresponding one of the not-identification-target groups is created.

The identification unit 20 accepts an unclassified image data item, applies the identification-target and not-identification-target generative models to the unclassified image data item, and classifies the unclassified image data item into a category that gives the largest score.

Referring now to a flowchart illustrated in FIG. 4, an operation of the image identification apparatus 10 will be described. The training image collection unit 12 collects a set of identification-target images which belong to an identification-target category and a set of not-identification-target images which belong to a not-identification-target category (the category "others") (S01). The learning model creation unit 14 extracts feature vectors from each of the training image data items belonging to a corresponding one of the categories (S02). Then, the learning model creation unit 14 creates each identification-target generative model on the basis of sets of the feature vectors extracted from a corresponding set of identification-target images which belong to a corresponding one of the identification-target categories (S03). The learning model creation unit 14 also creates a not-identification-target generative model on the basis of sets of the feature vectors extracted from the set of not-identification-target images which belong to the not-identification-target category (S04). At this time, the learning model creation unit 14 crates a generative model for each of the categories. The test evaluation unit 16 evaluates each of the generative models by using evaluation image data items (S05). If the user is satisfied with the evaluation result (YES in S06), the process ends. In contrast, if the user is not satisfied with the evaluation result (NO in S06), the classification unit 18 applies the identification-target generative model to each of the set of not-identification-target images and classifies the not-identification-target image into a corresponding one of multiple not-identification-target groups (S07). Processing of steps S02 to S06 is repeated until the user is satisfied with the evaluation result.

Specific examples for classifying each of the set of not-identification-target images into a corresponding one of the multiple not-identification-target groups will now be described.

First Example

Referring first to a flowchart illustrated in FIG. 5, a first example will be described. The classification unit 18 selects a training image data item Di that belongs to the category "original others" (S10). Then, the classification unit 18 applies an identification-target generative model created from a set of identification-target images which belong to an identification-target category c to the training image data item Di, thereby determining a score Sc for the category c (a probability of the training image data item Di belonging to the category c or a score proportional to the probability) (S11). For example, the classification unit 18 applies a generative model of the category "car" to the not-identification-target training image data item Di, thereby determining the score Sc for the category "car" (a probability of the training image data item Di belonging to the category "car" or the score proportional to the probability). Also, the classification unit 18 applies a not-identification-target generative model created from a set of not-identification-target images which belong to the category "original others" to the training image data item Di, thereby determining a score S0 for the category "original others" (a probability of the training image data item Di belonging to the category "original others" or a score proportional to the probability).

If the score Sc is larger than or equal to the score S0 (YES in S12), the classification unit 18 removes the training image data item Di from the category "original others" and classifies the training image data item Di into another not-identification-target category (S13). Specifically, the training image data item Di whose score Sc is larger than or equal to the score S0 belongs to the category "original others" but resembles image data items belonging to an identification-target category (for example, the category "car"). Thus, the classification unit 18 removes the training image data item Di from the category "original others" and classifies the training image data item Di into another not-identification-target category. The other not-identification-target category is referred to as a category "others 1" for convenience. Training image data items other than the training image data item Di that has been classified into the category "others 1" remain in the category "others". Then, an index i is incremented by one (S14). If all training image data items belonging to the category "others" have not been processed (NO in S15), processing of steps S10 to S14 is performed. If the score Sc is smaller than the score S0 (NO in S12), processing is performed from step S14.

Figure 6A:
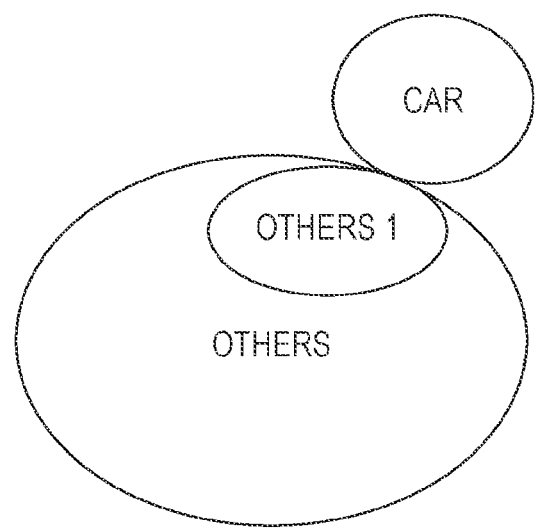
FIGS. 6A and 6B are schematic diagrams illustrating examples of distributions of categories according to the first example.

FIG. 6A illustrates a result of grouping performed on the category "others". In the case where only the category "car" is provided as the identification-target category, the category "original others" is divided into a new category "others" and the category "others 1" after the classification as illustrated in FIG. 6A. Training image data items belonging to the category "others 1" are negative examples of training image data items belonging to the category "car" but resemble the image data items belonging to the category "car".

Figure 6B:
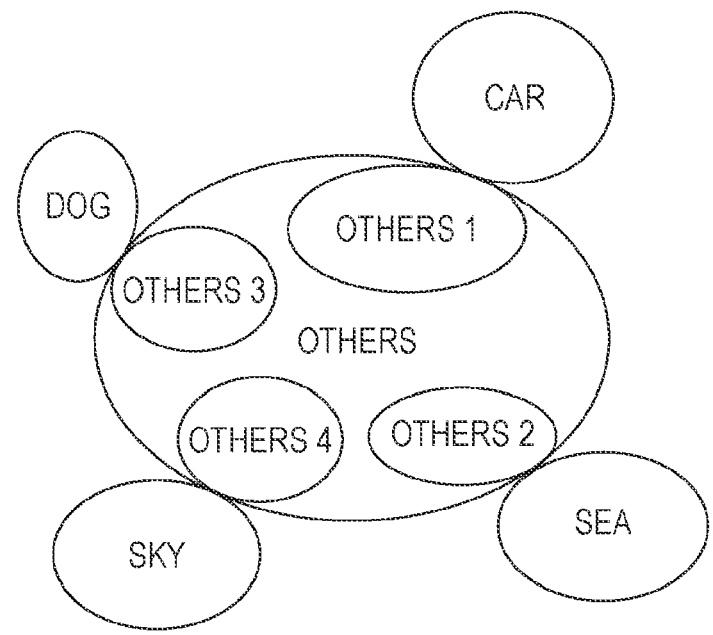

In the case where there are plural identification-target categories, each of training image data items belonging to the category "original others" is classified into a corresponding one of multiple not-identification-target groups through the similar process. FIG. 6B illustrates the result of the classification. Training image data items belonging to the category "others 1" are not-identification-target training image data items whose score Sc obtained by applying a generative model of the category "car" is larger than or equal to the score S0, and thus resemble the image data items belonging to the category "car". Training image data items belonging to the category "others 2" are not-identification-target training image data items whose score Sc obtained by applying a generative model of the category "sea" is larger than or equal to the score S0, and thus resemble the image data items belonging to the category "sea". Training image data items belonging to the category "others 3" are not-identification-target training image data items whose score Sc obtained by applying a generative model of the category "dog" is larger than or equal to the score S0, and thus resemble the image data items belonging to the category "dog". Training image data items belonging to the category "others 4" are not-identification-target training image data items whose score Sc obtained by applying a generative model of the category "sky" is larger than or equal to the score S0, and thus resemble the image data items belonging to the category "sky". Training image data items belonging to the category "others" after the classification are image data items that still remain after the training image data items belonging to the categories "others 1" to "others 4" are removed from the training image data items belonging to the category "original others".

If all training image data items belonging to the category "original others" have been processed (YES in S15), the learning model creation unit 14 creates a not-identification-target generative model (generative model of the category "others") from the set of training images which belong to the category "others" after the classification. The learning model creation unit 14 also creates a not-identification-target generative model (generative model of the category "others 1") from the set of training images which belong to the category "others 1".

Upon accepting an unclassified image data item, the identification unit 20 applies each of the generative models created through the above process to the unclassified image data item, and classifies the unclassified image data item into one of the identification-target and not-identification-target categories. For example, in the case where only the category "car" is provided as the identification-target category, the identification unit 20 applies the generative model of the category "car", the generative model of the category "others 1", and the generative model of the post-classification category "others" to the unclassified image data item. The identification unit 20 then classifies the unclassified image data item into a category corresponding to the generative model that gives the largest score. Specifically, if the score obtained by applying the generative model of the category "car" is the largest, the unclassified image data item is classified into the category "car". If the score obtained by applying the generative model of the category "others 1" is the largest, the unclassified image data item is classified into the category "others 1".

By classifying image data items using the generative model of the category "others 1" that is created in the above manner, detection accuracy for the identification-target category (positive example category) is improved. Specifically, for an image data item that is to belong to the category "original others" and that is possibly mistakenly determined to belong to an identification-target category (the category "car"), the score obtained by applying the generative model of the category "others 1" is larger than the score obtained by applying the identification-target generative model. Thus, the image data item is classified into the category "others 1", that is, a not-identification-target category (negative example category) instead of being classified into the category "car". As a result, the ability of the generative model to identify not-identification-target images is improved and the number of image data items that are mistakenly determined to belong to an identification-target category is decreased. Therefore, accuracy of detecting the identification-target category is improved.

A distribution of features of the set of training image data items belonging to the category "original others" is substantially flat. A generative model obtained from such a distribution of features gives a small score for any feature. As a result, the image identification ability of such a generative model tends to be low. Thus, in the case where the generative model of the category "original others" and an identification-target generative model are applied to an image data item that is to belong to the not-identification-target category (negative example category) and that is possibly mistakenly determined to belong to the identification-target category, the score obtained by applying the identification-target generative model may be larger than the score obtained by applying the generative model of the category "original others". In this case, the image data item is mistakenly classified into the identification-target category. However, according to the present exemplary embodiment, even if the score obtained by applying the generative model of the post-classification category "others" is smaller than the score obtained by applying the identification-target generative model, the score obtained by applying the generative model of the category "others 1" is larger than the score obtained by applying the identification-target generative model. Thus, the image data item is classified into the category "others 1". In this way, the ability of the generative model to identify not-identification-target images is improved, and, as a result, detection accuracy for the identification-target category is improved.

In the case where there are multiple identification-target categories, the learning model creation unit 14 similarly creates the generative model of the post-classification category "others" from the set of training images which belong to the category "others" after the classification, the generative model of the category "others 1" from the set of training images which belong to the category "others 1", a not-identification-target generative model (generative model of the category "others 2") from a set of training images which belong to the category "others 2", a not-identification-target generative model (generative model of the category "others 3") from a set of training images which belong to the category "others 3", and a not-identification-target generative model (generative model of the category "others 4") from a set of training images which belong to the category "others 4". With this configuration, an image data item that is to belong to a not-identification-target category (negative example category) and that is possibly mistakenly determined to belong to one of the identification-target categories is classified into one of the not-identification-target categories "others 1" to "others 4". As a result, detection accuracy for each identification-target category is improved.

Second Example

Referring now to a flowchart illustrated in FIG. 7, a second example will be described. In the second example, training image data items belonging to the category "original others" are classified into multiple not-identification-target groups by performing the process of the first example multiple times. Specifically, a group generated as a result of the first grouping is defined as a category "others 1", whereas a group generated as a result of the N-th grouping is defined as a category "others N". That is, by performing the process of the first example N times, the category "original others" is divided into categories "others", "others 1", "others 2", . . . , "others N". Each not-identification-target training image data item is classified into one of the not-identification-target categories. The following describes a specific process of the second example. It is assumed that a classification process has been performed on not-identification-target images once, the category "original others" has been divided into the category "others 1" and the post-classification category "others", and generative models of the category "others 1" and the post-classification category "others" have been created.

First, the classification unit 18 selects a training image data item Di belonging to the category "others" after the classification (S20). Then, the classification unit 18 applies an identification-target generative model created from a set of identification-target images which belong to an identification-target category c to the training image data item Di, thereby determining a score Sc for the category c (S21). For example, the classification unit 18 applies a generative model of the category "car" to the not-identification-target training image data item Di, thereby determining the score Sc for the category "car". Note that if the score Sc has already been determined, the already determined value may be used. Also, the classification unit 18 applies a generative model of the category "others 1", which is created from a set of not-identification-target images which belong to the category "others 1", to the training image data item Di, thereby determining a score T1 for the category "others 1" (S22). Furthermore, the classification unit 18 applies a not-identification-target generative model, which is created from a set of not-identification-target images which belong to the category "others" obtained after the classification into the category "others 1", to the training image data Di, thereby determining a score S0 for the category "others" (S22).

If the score Sc is the largest among the scores Sc, T1, and S0 (YES in S23), the classification unit 18 removes the training image data item Di from the category "others" and classifies the training image data item Di into a category "others 2", which is different from the categories "others" and "others 1" (S24). Specifically, although the training image data item Di having the score Sc that is the largest among the scores Sc, T1, and S0 belongs to the category "others", the training image data item Di relatively resembles image data items belonging to an identification-target category (for example, the category "car") and does not belong to the category "others 1". Accordingly, the training image data item Di is classified into the category "others 2". Training image data items other than the training image data items Di that have been classified into the categories "others 1" and "others 2" remain in the category "others". Then, the index i is incremented by one (S26). If all training image data items belonging to the category "others" have not been processed (NO in S27), processing of steps S20 to S26 is performed. If the score Sc is not the largest among the scores Sc, T1, and S0 (NO in S23), the training image data item Di is left in the category "others" (S25). The index i is then incremented by one (S26). Processing of S27 and below is performed.

If all training image data items belonging to the category "others" have been processed (YES in S27), the learning model creation unit 14 creates a not-identification-target generative model (generative model of the category "others") from the set of training images which belong to the category "others" after the classification. The learning model creation unit 14 also creates a not-identification-target generative model (generative model of the category "others 2") from the set of training images which belong to the category "others 2". Note that the generative model of the category "others 1" has already been created after the classification from the category "others" to the category "others 1".

After classification of the training image data items to the category "others 2" ends, classification to a category "others 3" is performed on the training image data items belonging to the category "others" through the similar process. For example, in step S22, the classification unit 18 applies the generative model of the category "others 1" to the training image data item Di, thereby determining the score T1 for the category "others 1". The classification unit 18 also applies the generative model of the category "others 2" to the training image data item Di, thereby determining a score T2 for the category "others 2". In addition, the classification unit 18 applies the not-identification-target generative model, which is created from the set of not-identification-target images which belong to the category "others" after the classification to the category "others 2", to the training image data item Di, thereby determining the score S0 for the category "others". If the score Sc is the largest among the scores Sc, T1, T2, and S0 (YES in S23), the classification unit 18 removes the training image data item Di from the category "others" and classifies the training image data item Di into the not-identification-target category "others 3". Thereafter, classification to the categories "others 4", "others 5", . . . , "others N" is performed on the training image data items belonging to the category "others" through the similar process. The process ends when a training image data item that is to belong to the category "others N" is no longer found. As a result of the above-described process, the generative models of the categories "others" and "others 1" to "others N" are created by the learning model creation unit 14.

Figure 8:
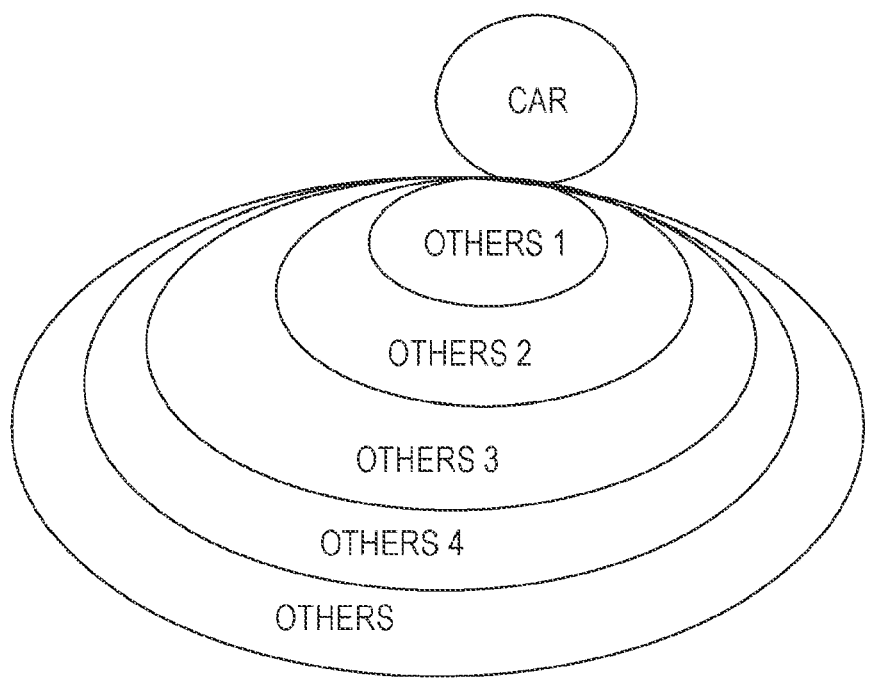
FIG. 8 is a schematic diagram illustrating an example of a distribution of categories according to the second example.

FIG. 8 illustrates a grouping result in the case where only the category "car" is provided as the identification-target category. By way of example, the classification process is performed four times (N=4). As a result, the category "original others" is divided into five categories. Specifically, the category "original others" is divided into categories "others" which is a new category obtained after the classification, "others 1", "others 2", "others 3", and "others 4". A training image data item belonging to the category "others 1" belongs to the category "original others". When the scores for such an training image data item are determined by applying generative models other than the one for the category "others 1" (that is, the generative models of the categories "car", "others 2", . . . , "others 4"), the largest score for the training image data item is obtained from the generative model of the category "car".

If the score Sc is not the largest (NO in S23), the training image data item Di may be classified into a category "others j" other than the category "others" in accordance with the score Sc. For example, if the score Sc is larger than or equal to the scores T2 and S0 but is smaller than the score T1, the training image data item Di for the score Sc may be classified into the category "others 2".

In the case where there are multiple identification-target categories, the category "others" is also divided into multiple not-identification-target groups by performing the classification process multiple times in the similar manner.

Figure 9:
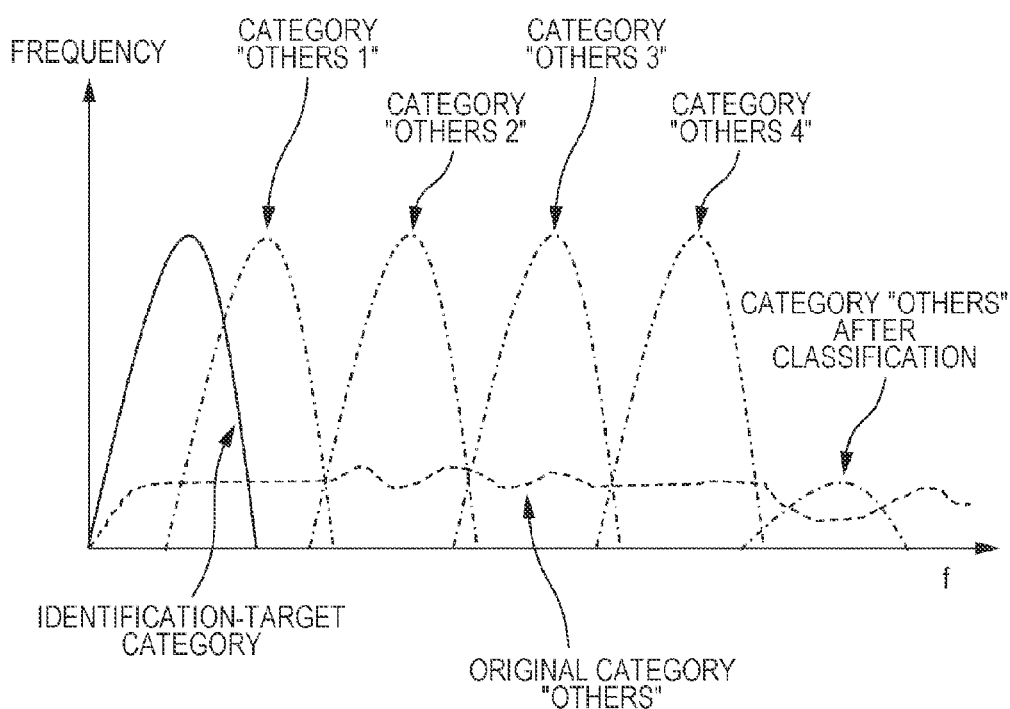
FIG. 9 is a graph illustrating distributions of features according to the second example.

FIG. 9 illustrates distributions of features of the generative models created in the above manner. The distribution of features of the category "original others" is relatively flat all over the feature space, whereas a distribution of features of the identification-target category has its peak at a specific position. The category "original others" is divided into categories, and a distribution of features is calculated for each of the categories. The obtained distributions of features each have their peak at a specific position. Specifically, distributions of features of the categories "others 1", "others 2", "others 3", "others 4", and "others" which is obtained after the classification are separate from each other and have their peaks at specific positions. The distribution of features of the category "others 1" is the closest to that of the identification-target category (for example, the category "car").

Upon accepting an unclassified image data item, the identification unit 20 applies the generative model of the identification-target category (for example, the generative model of the category "car") and the generative models of the categories "others 1" to "others 4" and "others" which is obtained after the classification, to the unclassified image data item, thereby determining the scores. The identification unit 20 then classifies the unclassified image data item to a category associated with the generative model that gives the largest score.

By using not-identification-target generative models created in the above manner, detection accuracy for the identification-target category is improved. For example, the case of classifying an image data item which has features of the category "others 1", belongs to the category "original others", and is possibly mistakenly determined to belong to the identification-target category (the category "car") will be discussed. When the generative models of the categories "original others", "others 1" to "others 4", and "others" obtained after the classification are applied to this image data item, the score obtained by applying the generative model of the category "others 1" is the largest among the determined scores. Thus, the image data item is classified into the category "others 1", that is, a not-identification-target category (negative example category), instead of being classified into the identification-target category (the category "car"). As a result, the ability of the generative model to identify not-identification-target images is improved and the number of image data items that are mistakenly determined to belong to an identification-target category is decreased. Therefore, accuracy for detecting the identification-target category is improved.

The distribution of features of the category "others 1" is close to that of the identification-target category. Because of this, when the generative model of the category "original others" and the identification-target generative model are applied to an image data item that is to belong to the category "others 1", the score obtained by applying the identification-target generative model may be larger than the score obtained by applying the generative model of the category "original others". In such a case, the image data item is mistakenly classified into the identification-target category. According to the second example, however, the score obtained by applying the generative model of the category "others 1" is larger than the score obtained by applying the identification-target generative model as described above. Accordingly, the image data item is classified into the category "others 1", that is, a not-identification-target category.

As described above, when the generative model of the category "original others" is used, an image data item that is to belong to the not-identification-target category is possibly mistakenly classified into an identification-target category. However, according to the second example, because such an image data item is classified into a not-identification-target category, detection accuracy for the identification-target category is improved.

Third Example

Figure 10:
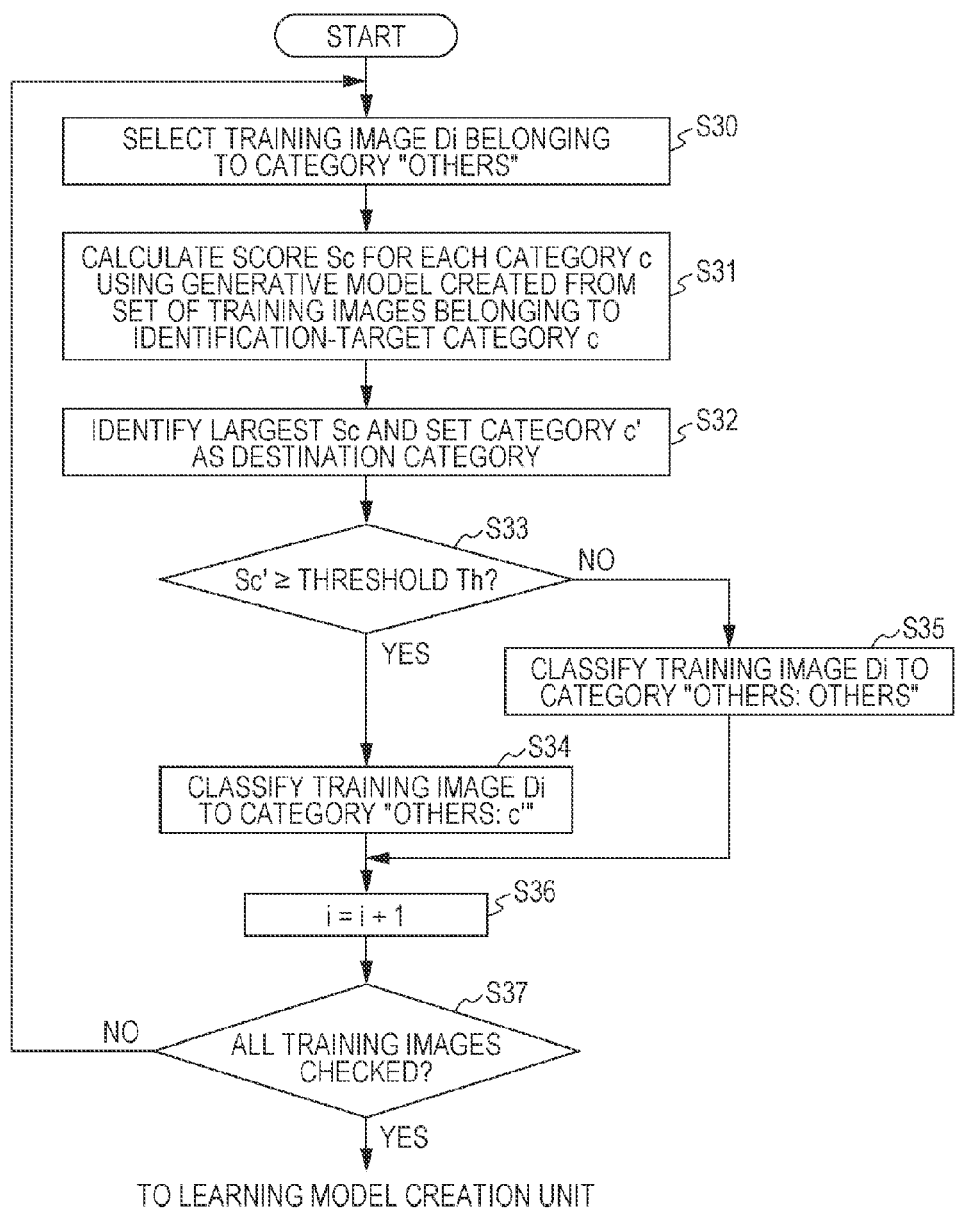
FIG. 10 is a flowchart illustrating an example of an operation according to a third example.

Referring now to a flowchart illustrated in FIG. 10, a third example will be described. In the third example, in the case where there are multiple identification-target categories, a generative model of each identification-target category is applied to each training image data item belonging to the category "original others" so as to calculate a score for the identification-target category. In accordance with the generative model that gives the largest score, the training image data item belonging to the category "original others" is classified into a corresponding group. For example, training image data items whose largest score is obtained from a same generative model among identification-target generative models are classified into a same not-identification-target group. The example of FIG. 2 shows four identification-target categories. Generative models of the four categories are applied to a not-identification-target training image data item, thereby determining scores. In accordance with the generative model that gives the largest score, the not-identification-target training image data item is classified. The following describes a specific process of the third example.

First, the classification unit 18 selects a training image data item Di belonging to the category "original others" (S30). Then, the classification unit 18 applies each identification-target generative model created from a corresponding set of identification-target images which belong to a corresponding identification-target category c to the training image data item Di, thereby determining a score Sc for the category c (S31). For example, the classification unit 18 applies generative models of the categories "car", "dog", "sea", and "sky" to the training image data item Di, thereby determining the scores Sc for the corresponding categories. In this example, four scores Sc are determined. Then, the classification unit 18 defines the largest score Sc among the four scores Sc as a score Sc' and defines a not-identification-target category, which is a classification destination, as a category c' (S32).

Figure 11:
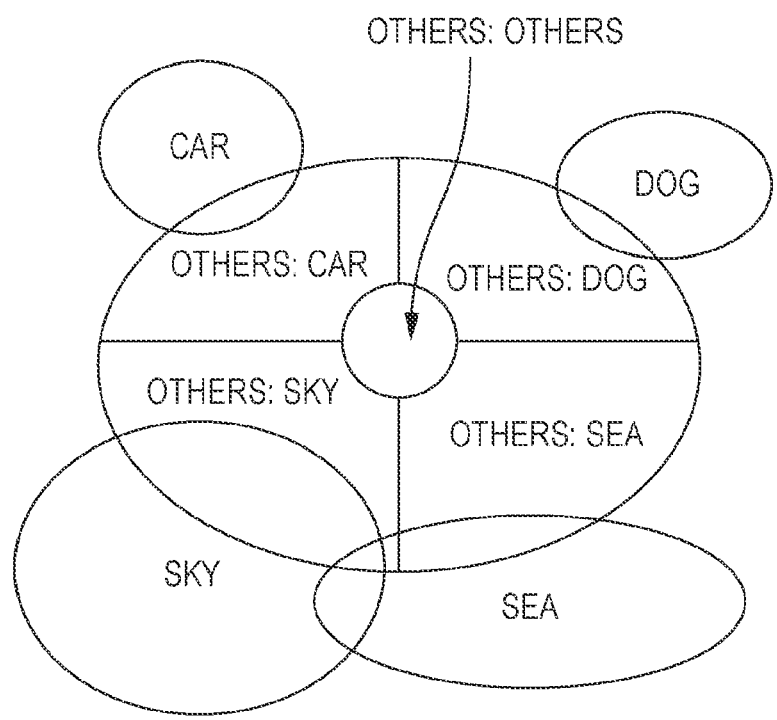
FIG. 11 is a schematic diagram illustrating a distribution of categories according to the third example.

If the score Sc' is larger than or equal to a predetermined threshold Th (YES in S33), the classification unit 18 removes the training image data item Di from the category "original others" and classifies the training image data item Di into a not-identification-target category "others: c'", which is different from the category "others" (S34). This classification process will be described with reference to FIG. 11. For example, suppose that the score Sc obtained by applying the generative model of the category "car" is the largest among the four scores Sc and is larger than or equal to the threshold Th. In this case, the classification unit 18 classifies the training image data item Di into a not-identification-target category "others: car". Specifically, training image data items that resemble image data items belonging to the category "car", among training image data items belonging to the category "original others", are classified into the category "others: car". Similarly, in the case where the score Sc obtained by applying the generative model of the category "dog" is the largest among the four scores Sc and is larger than or equal to the threshold Th, the classification unit 18 classifies the training image data item Di into a not-identification-target category "others: dog". Likewise, in the case where the score Sc obtained by applying the generative model of the category "sea" or "sky" is the largest among the four scores Sc and is larger than or equal to the threshold Th, the classification unit 18 classifies the training image data item Di into a not-identification-target category "others: sea" or "others: sky". If the score Sc' is smaller than the threshold Th (NO in S33), the classification unit 18 classifies the training image data item Di into a not-identification-target category "others: others", which is different from the categories "original others" and "others: c'" (S35). The training image data item Di whose score Sc' is smaller the threshold Th does not resemble image data items belonging to the four identification-target categories. Thus, the training image data item Di is classified into the category "others: others".

Then, the index i is incremented by one (S36). If all training image data items belonging to the category "original others" have not been processed (NO in S37), processing of steps S30 to S36 is performed.

If all training image data items belonging to the category "original others" have been processed (YES in S37), the learning model creation unit 14 creates a not-identification-target generative model of each not-identification-target category from the set of training images which belong to the not-identification-target category. For example, the learning model creation unit 14 creates a not-identification-target generative model (generative model of the category "others: car") from the set of training images which belong to the category "others: car", a not-identification-target generative model (generative model of the category "others: dog") from the set of training images which belong to the category "others: dog", a not-identification-target generative model (generative model of the category "others: sea") from the set of training images which belong to the category "others: sea", and a not-identification-target generative model (generative model of the category "others: sky") from the set of training images which belong to the category "others: sky". As a result, eight classifiers are created in total. In addition, the learning model creation unit 14 may create a not-identification-target generative model (generative model of the category "others: others") from the set of training images which belong to the category "others: others". In this case, nine classifiers are created in total.

Upon accepting an unclassified image data item, the identification unit 20 applies each identification-target generative model and each not-identification-target generative model to the unclassified image data item, thereby determining the scores. The identification unit 20 then classifies the unclassified image data item into a category corresponding to the generative model that gives the largest score.

A not-identification-target training image data item that is classified into the category "others: car" resembles identification-target training image data items belonging to the identification-target category "car" and is possibly mistakenly identified to be an image data item of "car" even though it is not an image data item of "car". Thus, when the generative models of the category "original others" and of the identification-target category "car" are applied to the image data item that is possibly mistakenly identified as an image data item of "car", the score obtained by applying the generative model of the category "car" may be larger than the score obtained by applying the generative model of the category "original others". In such a case, the image data item is mistakenly classified into the identification-target category "car".

On the other hand, the image data item that is possibly mistakenly identified as an image data item of "car" gives a larger score for the generative model "others: car" than those obtained by applying the generative models other than that of "others: car". Specifically, when the generative models of the category "others: car" and of the category "car" are applied to the image data item, the score obtained by applying the generative model of the category "others: car" is larger than the score obtained by applying the generative model of the category "car". As a result, the image data item that is possibly mistakenly identified as an image data item of "car" is classified into the category "others: car", which is a not-identification-target category, instead of being classified into the category "car". As a result, the ability of the generative model to identify not-identification-target images is improved and the number of image data items that are mistakenly determined to belong to an identification-target category is decreased. Therefore, accuracy for detecting the identification-target category is improved.

Note that the categories "others: car", "others: dog", "others: sea", and "others: sky" may be integrated into one category. In this case, the category "original others" is divided into two not-identification-target categories.

Also, the second example may be applied to the third example. Specifically, the category "others: c'" may be further divided into multiple not-identification-target categories and generative models for the individual not-identification-target categories may be created.

Generative models created in each of the above-described examples may be used as an application of an image recognition tool. For example, in the case where an automatically or semi-automatically collected set of training images include noise, the identification ability of a generative model created from the set of training images decreases in some cases. In the present exemplary embodiment, a set of not-identification-target training images are classified into multiple groups using an identification-target generative model. Because this improves the identification ability of a not-identification-target generative model even if the set of training images include noise, detection accuracy for the identification-target category is improved.

The above-described image identification apparatus 10 is implemented as a result of hardware resources and software operating in cooperation with each other, for example. Specifically, the image identification apparatus 10 includes a processor (not illustrated), such as a central processing unit (CPU). The processor reads out a program stored in a storage device (not illustrated) and executes the program, and thereby implementing individual functions of the training image collection unit 12, the learning model creation unit 14, the test evaluation unit 16, the classification unit 18, and the identification unit 20 described above. The program is stored in the storage device, such as a hard disk drive (HDD), via a recording medium, such as a compact disc (CD) or a digital versatile disc (DVD), or via a communication medium, such as a network. Alternatively, the program may be pre-stored in the storage device, such as an HDD. The program stored in the storage device, such as an HDD, is read into a memory, such as a random access memory (RAM), and is executed by the processor, whereby functions of the above-described units are implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image identification apparatus comprising:
   at least one processor which implements:
      a first generative model creation unit configured to extract feature information from a set of identification-target images which belong to an identification-target category, and create a first generative model on the basis of the feature information, the first generative model being used to determine a probability of an image belonging to the identification-target category;
      a classification unit configured to apply the first generative model to each of a set of not-identification-target images which belong to a not-identification-target category which is different from the identification-target category so as to determine a probability of the not-identification-target image belonging to the identification-target category, and classify the not-identification-target image to a corresponding one of a plurality of not-identification-target groups in accordance with the probability; and
      a second generative model creation unit configured to extract feature information from each set of not-identification-target images which belong to a corresponding one of the plurality of not-identification-target groups, and create a second generative model of each of the plurality of not-identification-target groups on the basis of the corresponding feature information, each second generative model being used to determine a probability of an image belonging to a corresponding one of the plurality of not-identification-target groups.

2. The image identification apparatus according to claim 1, wherein the at least one processor further implements:
   a third generative model creation unit configured to extract feature information from the set of not-identification-target images belonging to the not-identification-target category before classification is performed by the classification unit, and create a third generative model on the basis of the feature information, the third generative model being used to determine a probability of an image belonging to the not-identification-target category,
   wherein the classification unit is further configured to classify each of the set of not-identification-target images to a corresponding one of the plurality of not-identification-target groups by applying the first generative model and the third generative model to each of the set of not-identification-target images which belong to the not-identification-target category, and
   by classifying, among the set of not-identification-target images which belong to the not-identification-target category, every not-identification-target image for which the probability obtained by applying the first generative model is larger than or equal to the probability obtained by applying the third generative model, into a first not-identification-target group among the plurality of not-identification-target groups.

3. The image identification apparatus according to claim 2, wherein the third generative model creation unit is further configured to create a new third generative model from a set of not-identification-target images that have not been classified into the first not-identification-target group, and
   wherein the classification unit is further configured to apply the first generative model and the new third generative model to each of the set of not-identification-target images that have not been classified into the first not-identification-target group, and classify every not-identification-target image for which the probability obtained by applying the first generative model is larger than or equal to the probability obtained by applying the new third generative model, into a second not-identification-target group among the plurality of not-identification-target groups.

4. The image identification apparatus according to claim 1, wherein the identification-target category includes a plurality of identification-target categories,
   wherein the first generative model creation unit is further configured to extract feature information from each set of identification-target images which belong to a corresponding one of the plurality of identification-target categories, and create the first generative model of each of the plurality of identification-target categories on the basis of the corresponding feature information of the identification-target category, and
   wherein the classification unit is further configured to apply the first generative models of the plurality of identification-target categories to each of the set of not-identification-target images which belong to the not-identification-target category so as to determine probabilities of the not-identification-target image belonging to the individual identification-target categories, and classify the not-identification-target image into a corresponding one of the plurality of not-identification-target groups in accordance with the probabilities.

5. The image identification apparatus according to claim 4, wherein the classification unit is further configured to classify a set of not-identification-target images whose largest probability is obtained from a same first generative model among the first generative models of the plurality of identification-target categories, into a same not-identification-target group among the multiple not-identification-target groups.

6. The image identification apparatus according to claim 1, wherein the at least one processor further implements:
an identification unit configured to apply the first generative model and the second generative models to an unclassified image, and classify the unclassified image into the identification-target category or the not-identification-target category in accordance with results obtained by applying the first generative model and the second generative models to the unclassified image.

7. An image identification method comprising:
extracting feature information from a set of identification-target images which belong to an identification-target category, and creating a first generative model on the basis of the feature information, the first generative model being used to determine a probability of an image belonging to the identification-target category;
applying the first generative model to each of a set of not-identification-target images which belong to a not-identification-target category which is different from the identification-target category so as to determine a probability of the not-identification-target image belonging to the identification-target category, and classifying the not-identification-target image to a corresponding one of a plurality of not-identification-target groups in accordance with the probability; and
extracting feature information from each set of not-identification-target images which belong to a corresponding one of the plurality of not-identification-target groups, and creating a second generative model of each of the plurality of not-identification-target groups on the basis of the corresponding feature information, each second generative model being used to determine a probability of an image belonging to a corresponding one of the plurality of not-identification-target groups.

8. A non-transitory computer readable medium storing a program causing a computer to execute a process for image identification, the process comprising:
extracting feature information from a set of identification-target images which belong to an identification-target category, and creating a first generative model on the basis of the feature information, the first generative model being used to determine a probability of an image belonging to the identification-target category;
applying the first generative model to each of a set of not-identification-target images which belong to a not-identification-target category which is different from the identification-target category so as to determine a probability of the not-identification-target image belonging to the identification-target category, and classifying the not-identification-target image to a corresponding one of a plurality of not-identification-target groups in accordance with the probability; and
extracting feature information from each set of not-identification-target images which belong to a corresponding one of the plurality of not-identification-target groups, and creating a second generative model of each of the plurality of not-identification-target groups on the basis of the corresponding feature information, each second generative model being used to determine a probability of an image belonging to a corresponding one of the plurality of not-identification-target groups.

* * * * *